UNITED STATES PATENT OFFICE.

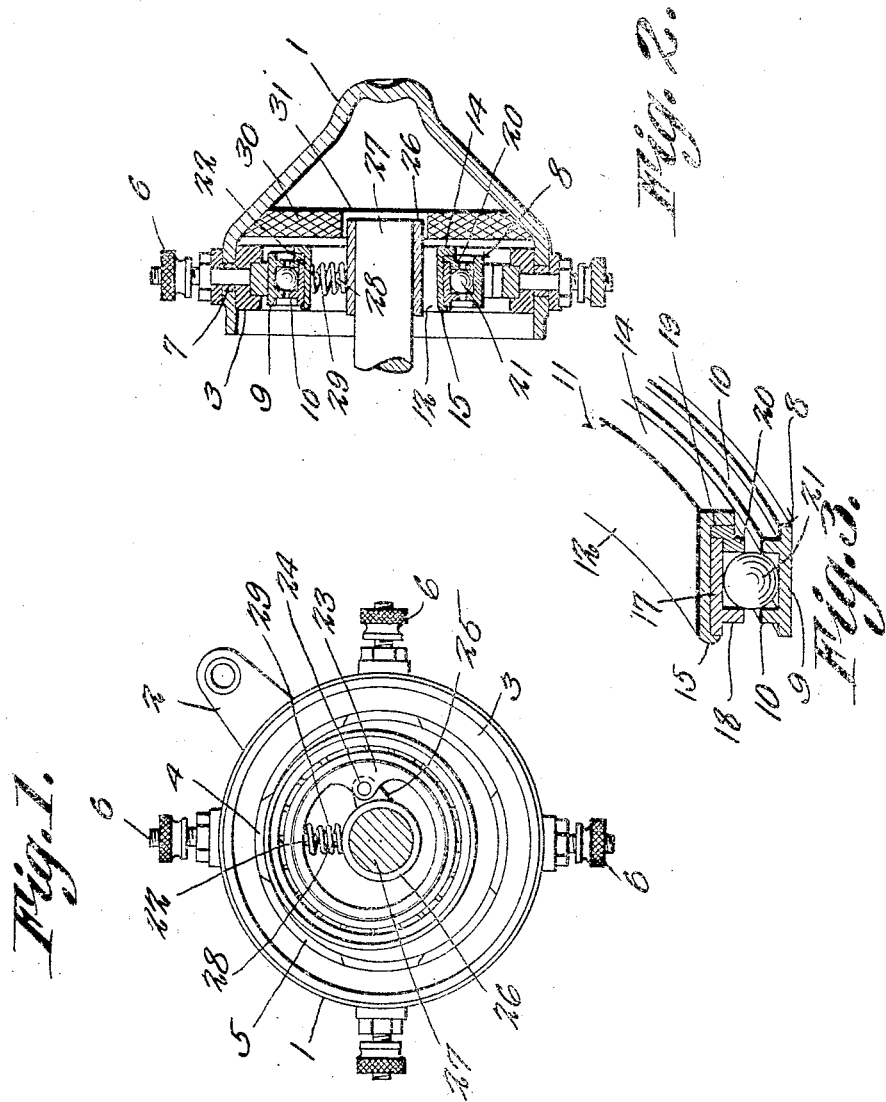

JESUS M. LÓPEZ, OF SAN ANTONIO, TEXAS.

ROLLER-DISTRIBUTER.

1,372,177.

Specification of Letters Patent.  Patented Mar. 22, 1921.

Application filed May 15, 1920. Serial No. 381,786.

*To all whom it may concern:*

Be it known that I, JESUS M. LÓPEZ, a citizen of the Republic of Mexico, residing at San Antonio, in the county of Bexar and State of Texas, have invented a new and useful Roller-Distributer, of which the following is a specification.

The device forming the subject matter of this application is a distributer of the sort used on a light and relatively inexpensive automobile of widely known construction, and the invention aims to provide novel means whereby friction will be reduced, novel means being provided for holding certain of the parts eccentrically upon a shaft.

Within the scope of what is claimed, a mechanic may change the structure shown and described, without departing from the spirit of the invention.

In the drawings:—Figure 1 shows in end elevation, a device constructed in accordance with the invention; Fig. 2 is a longitudinal section; Fig. 3 is a perspective view illustrating the ball races.

The numeral 1 denotes a casing carrying an arm 2 whereby the casing may be rocked to adjust the timing. An insulating ring 3 is located within the casing and carries contacts 4, alternating with insulating strips 5 to form a track. Binding posts 6, insulated as shown at 7 from the casing 1, are connected with the contacts 4. The structure above described is more or less common and need not be alluded to at great length.

The numeral 8 denotes an outer ball race including a base 9 and inwardly projecting ribs 10, the race being of annular form. The numeral 11 marks an inner ball race which is a composite structure, the inner ball race comprising a main member embodying a base 12, a side flange 14 and a bendable lip 15. The inner ball race 11 comprises an auxiliary member including a body 17 having a flange 18. One edge of the body 17 abuts against the lip 15, the flange 18 being disposed adjacent to the lip. The inner ball race 11 comprises a ring including relatively offset flanges 19 and 20. The flange 19 abuts against the base 12 and is bound between the flange 14 and the edge of the body 17, the flange 20 overhanging the body 17 at one edge thereof. Anti-friction elements, such as balls 21, roll on the parts 17 and 9, between the flanges 10 on the one hand, and between the flanges 18 and 20 on the other hand. The base 12 of the main member of the inner ball race 11 is supplied with a radial stud 22, and with ears 23, the ears carrying a pivot element 24 on which is mounted an arm 25 projecting from a collar 26 fixed to a shaft 27, the shaft and the collar projecting into an opening 31 in a diaphragm 30 located in the casing 1. There is a stud 28 on the collar 26, the ends of a helical compression spring 29 being mounted on the studs 28 and 22.

The construction, obviously, is such that friction will be reduced between the ball races 8 and 11, the ball race 11 being rotated with the shaft 26, and being pivoted to the said shaft, so that, under the action of the spring 29, the races will be disposed eccentrically with respect to the shaft, the outer ball race 8 coming into engagement successively with the contacts 4.

I claim:—

1. In a device of the class described, a shaft; a casing having contacts; inner and outer races about the shaft; anti-friction elements between the races; a collar on the shaft and having an arm pivoted to the inner race; and a compression spring between the collar and the inner race, the spring constituting means for holding the races yieldably in eccentric relation to the shaft, whereby the outer race will traverse the contacts.

2. A device of the class described, constructed as set forth in claim 1, and further characterized by the fact that the spring is of helical form, the collar and the inner race having studs which receive the ends of the spring.

3. A device of the class described, constructed as set forth in claim 1, and further characterized by the fact that the inner race comprises a main member including a base, a flange and a bendable lip, an auxiliary member comprising a body having a flange, and a ring including offset flanges, one offset flange overhanging the body of the auxiliary member, the other offset flange and the body of the auxiliary member being retained between the lip and the flange of the main member.

4. In a device of the class described, a shaft, a casing having contacts; inner and outer races about the shaft, the outer race traversing the contacts; anti-friction elements between the races; means for pivoting the inner race to the shaft; and a spring interposed between the inner race and the shaft for disposing the races in eccentric relation to the shaft.

In testimony that I claim the foregoing as my own, I have hereto affixed my signature in the presence of two witnesses.

JESUS M. LÓPEZ.

Witnesses:
F. L. SEARCH,
MASON B. LAWTON.